United States Patent [19]
Bird et al.

[11] Patent Number: 5,107,424
[45] Date of Patent: Apr. 21, 1992

[54] CONFIGURABLE MARINE STEERING SYSTEM

[75] Inventors: Rebecca A. Bird, Earlysville; David A. Bennett, Charlottesville; Albert L. Coleman, Scottsville; Jeffrey C. Johnson; Ronald K. Richey, both of Charlottesville; Gregory Schluge, Afton; Steven E. Schubert, Charlottesville; Eldon J. Thompson, Ruckersville; John F. Yancey, Jr., Charlottesville, all of Va.

[73] Assignee: Sperry Marine Inc., Charlottesville, Va.

[21] Appl. No.: 488,921

[22] Filed: Mar. 5, 1990

[51] Int. Cl.$^5$ ............... G08B 21/00; B63H 25/08; G05D 1/01; B06G 7/70
[52] U.S. Cl. .................. 364/424.01; 364/457; 318/588; 340/984; 114/144 RE
[58] Field of Search ............. 318/588; 364/424.01, 364/447, 448, 457, 571.01, 571.06, 434; 114/144 RE, 144 A; 340/984, 985, 986, 987; 33/1 PT, 363 K, 363 R

[56] References Cited

U.S. PATENT DOCUMENTS

| | | | |
|---|---|---|---|
| 3,593,093 | 7/1971 | Bettcher | 318/588 |
| 3,673,977 | 7/1972 | Hendley | 318/588 X |
| 3,949,696 | 4/1976 | Onishi et al. | 114/144 E |
| 3,952,681 | 4/1976 | Tucker | 318/588 X |
| 4,055,135 | 10/1977 | Wesner | 318/588 X |
| 4,074,648 | 2/1978 | Reid et al. | 318/588 X |
| 4,120,258 | 10/1978 | Spurgin | 114/144 E |
| 4,129,087 | 12/1978 | Dimmick et al. | 364/457 X |
| 4,223,624 | 9/1980 | Iyeta | 318/588 X |
| 4,253,149 | 2/1981 | Cunningham et al. | 364/457 X |
| 4,342,274 | 8/1982 | Spurgin et al. | 318/588 X |
| 4,374,423 | 2/1983 | Kundler et al. | 364/457 X |
| 4,542,464 | 9/1985 | Kramer | 364/457 |
| 4,625,411 | 12/1986 | Kashiwagi et al. | 33/1 PT |
| 4,692,868 | 9/1987 | Wesner et al. | 364/447 |
| 4,739,236 | 4/1988 | Burkenpas | 318/588 |
| 4,777,602 | 10/1988 | Wesner | 318/588 X |
| 4,799,163 | 1/1989 | Wesner | 318/588 X |
| 4,811,679 | 3/1989 | Masuzawa | 364/457 X |
| 4,855,739 | 8/1989 | Miyayama et al. | 340/984 |
| 5,034,895 | 7/1991 | Johson et al. | 364/457 |

Primary Examiner—Parshotam S. Lall
Assistant Examiner—Thomas S. Auchterlonie
Attorney, Agent, or Firm—Seymour Levine

[57] ABSTRACT

A ship steering system has a multiplicity of selectable steering stations. A continuously rotating helm at each steering station generates digital rudder control signals which cause a predetermined rudder movement for each 360° of helm rotation. Steering stations are selected through a multiplexer controlled at a command steering station. The steering system is operable from the command steering station in a plurality of modes, which includes auto-pilot, helm (full-follow-up), and tiller (non-follow-up). Helm and/or tiller modes of operation are available at steering stations remote from the command steering station. The system provides for an emergency takeover from the helm or autopilot modes by automatically establishing the tiller mode when the tiller stick is moved. When in the autopilot mode an alarm system provides an alert should the course deviate from a selected course tolerance.

19 Claims, 13 Drawing Sheets

CONFIGURABLE MARINE STEERING SYSTEM

BACKGROUND OF THE INVENTION

1. Field of the Invention

The invention pertains to the field of ship's steering and control and more particularly to a configurable digital autopilot for steering and controlling a marine vessel.

2. Description of the Prior Art

Ship maneuvering and course control have advanced from the tiller control of the rudder to the present day autopilots. Throughout the ages a bridge has been the command center of the ship and control functions have been performed at this location. Present day large ships, such as super tankers and container ships, may contain satellite control centers (remote stations) which provide better visibility of a maneuvering situation as, for example, in harbor navigation and ship docking. In such situations control of the ship may be passed to a remote station. In the prior art the remote stations, each of which may provide different operating modes, are hard wired to the steering system. Switching to a remote station is accomplished with multiple deck switches and numerous electromechanical relays.

Since automatic navigation is not always feasible and provision must be made for emergency situations, a steering system for a ship must provide, in addition to an autopilot, helm, and tiller steering modes of operation. In the prior art helm steering is provided with an analog helm. Typically, such steering systems utilize potentiometers to convert the angular rotation of the wheel to an analog voltage. This analog voltage requires an analog-to-digital conversion when digital signal processing is utilized in the autopilot to convert the helm signals to rudder orders. Further, such analog helms require mechanical and electrical calibration to scale the voltage to degrees of wheel rotation and to set the zero point. An analog helm has an absolute rudder order scale limited to a particular hard over rudder order and is not configurable for larger hard over values. This necessitates a mechanical stop on the potentiometer to limit its motion to the hard over rudder order on the scale. Traditionally the wheel of an analog helm traverses multiple turns between hard over left and hard over right orders to provide a desired fine rudder adjustment, thus requiring a gearing system between the wheel and the potentiometer to convert the wheel motion to potentiometer motion between the potentiometer stops. Each angular position of the wheel in an analog helm is associated with a predetermined rudder order. Therefore, to provide a bumpless transfer from a previous mode to an analog helm mode requires that the wheel be positioned to the angular rotation associated with the rudder order for the rudder position of the previous mode. If the wheel is not so positioned the rudder will move to the rudder angle associated with the wheel position, which in many instances causes the ship to experience a significant sudden rudder change or "bump".

Tiller control in the prior art, also known as non-follow-up control (NFU) for marine steering systems typically include one of three NFU operational modes; an NFU mode wherein the ship is tiller controlled, a jog NFU mode wherein tiller operation is temporarily invoked for a quick maneuver and then returns to the previous mode of operation, and force NFU which is an emergency takeover for tiller operation which remains in force until a new mode of operation is selected by the Operator. Only one NFU mode is provided and no choices are available. Further, the prior art NFU controls are not coordinated with follow-up (helm) mode solenoid controls. When invoked, the NFU overrides the pump solenoids from being actively driven by the autopilot, causing the autopilot to develop an increasing rudder error which causes all solenoids to energize at once as soon as the NFU device is de-activated. This pattern of use causes unnecessary hydraulic shock due to large changes in fluid flow through the pump system.

When a turn command is received in automatic modes, the autopilot controls the rate of turn in accordance with a selected turn rate. Conventionally, rate control turns are provided by rate pilots separate from the autopilot's maneuver and heading keeping control. These rate pilots utilize data from a rate gyro and the selected rate order to control the rudder. The rudder remains under the rate pilot control until it is deactivated, it does not stop at a desired course. The system Operator must determine when the desired course has been achieved and then transfer from the rate controller mode to the heading keeping mode or to helm steering. These prior art systems cannot provide for calibration of the rate pilot to the ship's turning characteristics. Additionally, the rate control does not accommodate changes in speed and ship load conditions. One autopilot of the prior art integrates rate control with other automatic controllers. This autopilot serves primarily large slow turning vessels and can accommodate rate orders to an upper limit of 60°/min. Control rates ramp up and down at a rate of zero to 60°/min. in twice the rise time (roll period of the ship). Rudder order update once per second is sufficient, and heading rate is filtered with a fixed time constant of ½ second. Speed scaling and calibration of proportional gain, integral time constant, feed forward gain, and rise time for two load conditions is provided with a range of values appropriate for large ships 20,000 DWT and up. Rudder order for rate control is not filtered prior to the output, smoothing is provided by the rudder control elements. This rate controller can be turned off prior to course changes to use the PID controller, but cannot be turned off during a maneuver.

Heading repeater and course selectors in prior art marine autopilots utilize step data from a gyro compass coupled to a compass repeater having a synchro or potentiometer that is manually positioned with respect to the repeater dial for heading selection to produce a proportional rudder control signal. Provisions for coupling to other compass signals such as synchro data or serial heading are generally not provided. The compass repeater must be synchronized with the gyrocompass whenever gyrocompass power is applied. Further, if the autopilot heading source is changed as, for example, from the primary gyrocompass to the backup gyrocompass, the repeater must be resynchronized to the new gyrocompass. Additionally, a prior art course selector is generally coupled to a potentiometer which produces a heading error voltage that is translated to a rudder order by the autopilot when in the automatic steering mode. Consequently, transfers from helm or tiller modes are not "bumpless" unless the Operator turns the pointer back to the lubber line before selecting the autopilot mode. When rudder control changes suddenly from helm or tiller control to a non-zero heading error control a "bump" occurs in these prior art systems.

Off course alarms in the prior art marine autopilots compare the ship's heading to a heading reference which is set by the Operator. An alarm is sounded when the heading error established by this comparison exceeds a heading error tolerance also set by the Operator. These devices must be aligned to every course change. Consequently, in a turning maneuver, during which heading error tolerance is exceeded constantly, chronic false alarms occur until the ship comes about on the new course. In these systems the alarm duration is generally fixed and a set heading reference cannot be exchanged with the reference for the steering maneuver to prevent the occurrence of the false alarms.

The servo amplifiers in the prior art autopilot systems use both analog and logic circuitry to determine rudder error and convert this error to a multistage solenoid control. The pump solenoids of the hydraulic system, which provide the rudder control, are wired to specific servo amplifiers and are energized and deenergized at values which are set when the system is installed, regardless of the autopilot's mode of operation or pump system selected in steering systems that contain more than one pump system. Staging pump solenoid operation follows a fixed sequence, and altering the staging to provide more efficient operation under certain system conditions is not available.

SUMMARY OF THE INVENTION

The present invention provides a digital steering control system for surface ships which is adaptable at the steering mechanism of the installation ship. The novel steering control system comprises eight sub-systems which can be fully customized to the installation ships steering characteristics, sensors, steering gear, options, and usage patterns pertaining to the ship's mission. This system further provides greater reliability, manufactureability, and ease of installation and operation than previously afforded by prior art steering control systems.

In accordance with the invention four basic steering modes are provided; NFU, non-follow-up (tiller), FFU, full-follow-up, (helm); Remote; and Auto/Nav.

The helm includes a wheel having no mechanical stops which is positioned on a shaft coupled to an optical shaft position sensor, a rudder order indicator (ROI), and a central processing unit (CPU). Movement of the wheel is conveyed by the optical shaft position sensors to the CPU which processes the electrical signals provided by the optical sensor to update the rudder order. One clockwise/counterclockwise revolution of the wheel increase/decreases rudder order by 20°. The helm is customized to the hard over rudder position of the ship. When the ROI indicates hard over, all further wheel motion in the same direction is ignored by the system and any wheel motion in the opposite direction immediately causes a reduction in the rudder order from the hard over position.

In the NFU operation mode, rudder movement is directed by issuing right/left control signals to the hydraulic pump solenoids. No automatic follow-up of the rudder position is utilized, the Operator positions the rudder with the aid of an independent rudder angle indicator. NFU control is provided when the system is in the NFU mode or when the NFU lever is operated, thus providing an emergency takeover during any steering mode. Rudder movements right and left are in accordance with right and left movements of the NFU device and the rudder holds its position when the NFU device is released. Two modes of emergency operation are available, "jog" and "force". When the "jog" mode is in operation the system returns to the previous steering mode after the emergency takeover, while in the "force" NFU mode the system will remain in the NFU mode after the emergency takeover. When the system is switched to the NFU mode it remains in this mode until the Operator selects another steering mode.

Steering in the Auto/Nav mode utilizes the current setting of the course selector, the compass heading, and a turn rate order provided by the Operator to compute a rudder order. The system selects rudder orders to reduce the heading area to zero while minimizing rudder motion. Nav steering differs from the Auto steering in that it utilizes serial course and turn rate orders from a navigation station to provide way-point steering with rate controlled maneuvers. A Turn Rate Control provides rate control turns for the Auto/Nav steering, while a bias integration subsystem computes a rudder order bias to quickly offset weather and seaway effects on the Auto/Nav steering. An off-course alarm is provided which checks the Auto/Nav steering performance to alert ship's Officers to compass or steering gear failure or inadequate progress during a maneuver.

A multiplicity of remote stations may be accommodated through a multiplexer unit. This multiplexer includes cable connections from the primary station to enable and activate selected remote stations. Each remote station may be configured to provide NFU control, FFU control, or to provide a selection between NFU and FFU control. The Auto/Nav mode may not be selected at a remote station. When a remote station is activated the system processes rudder commands from that selected station.

All rudder orders are directed to a pump control unit which provides the signals to the hydraulic pump solenoids in the steering gear of the ship to position the rudder or rudders in accordance with the rudder order. The pump control unit is adaptable to any ships pump configuration and receives rudder orders from all steering modes except the NFU mode, which provides rudder orders directly to the rudder pump solenoids. For each rudder the pump control unit receives rudder or stroke position signals from an analog rudder repeatback unit, converts these analog signals to digital signals, adds bias and applies right or left scaling. A rudder order error signal is computed from the rudder order and repeatback signals and then filtered to remove noise. Pump stages are turned on in accordance with the rudder error magnitude and direction, stages being added one at a time at predetermined degree and time intervals to prevent hydraulic shock due to sudden high fluid flow. In a like manner hydraulic stages are removed one at a time as the rudder error is reduced to 0°. In addition a time delay is imposed between successive activations of a particular solenoid in order to prevent burnout due to repeated inrush currents in AC type solenoids. The system can be configured for DC type solenoids for which the successive type activation delay is not imposed. When a ship is configured with a dual rudder system, each rudder is independently controlled as if it were in a single rudder system. When rudder orders are not available, such as in NFU mode or on power-up before helm or auto rudder orders are provided all active stages are cleared causing the rudder to hold its last position. At the availability of a rudder order, stages are added at the predetermined degree and time intervals in accordance with the new rudder error value. This allows smooth rudder control during a steering mode change.

DESCRIPTION OF THE PREFERRED EMBODIMENTS

Figure 1:
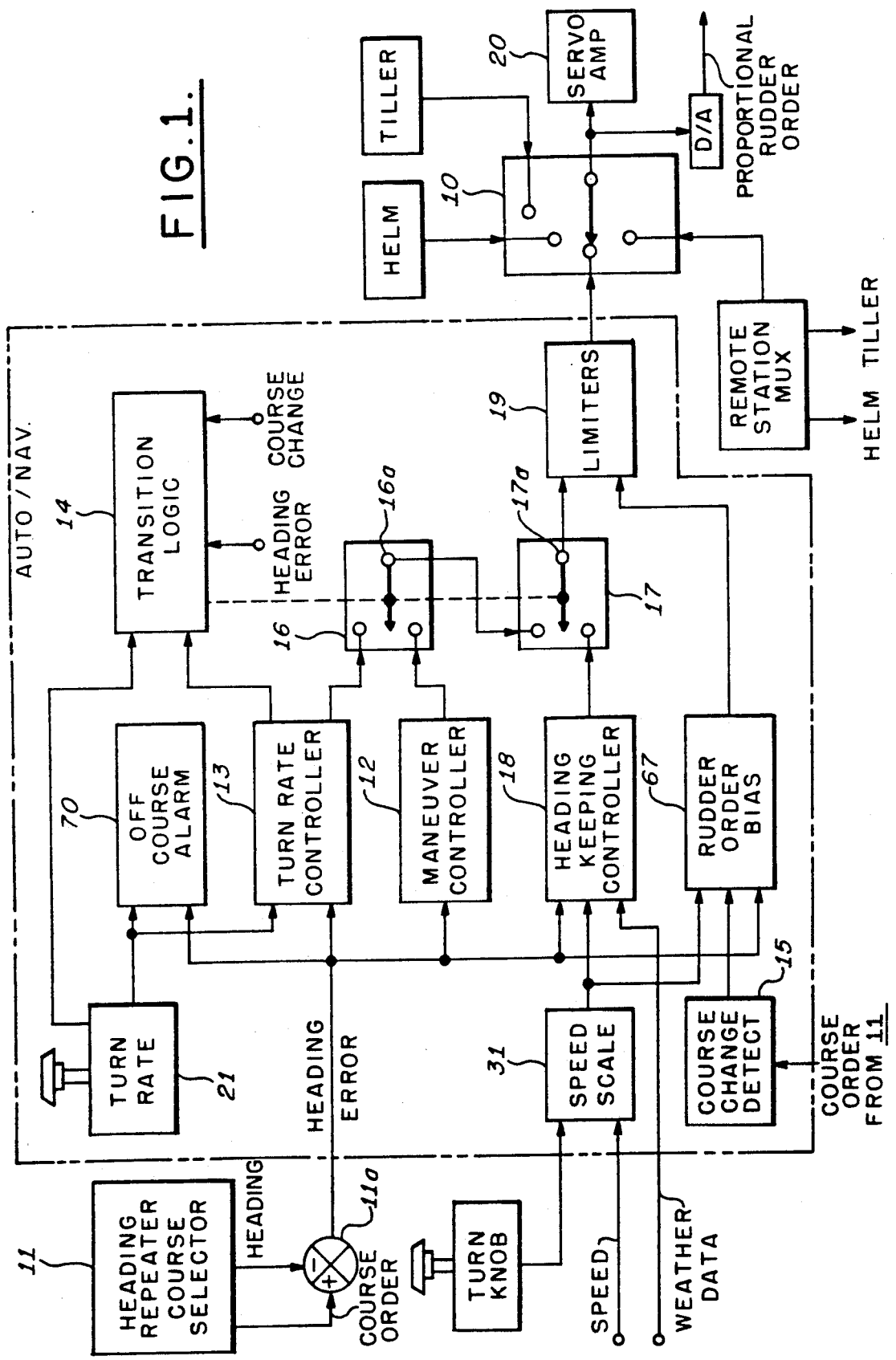
FIG. 1 is a block diagram of a marine autopilot including therein the switchable modes of a preferred embodiment of the invention.

Refer to FIG. 1 wherein a block diagram of marine steering system is shown with a mode selection switch 10 in the autopilot/navigation mode position. A heading repeater and course selector 11, yet to be described, provides heading and course representative signals to heading error detector 11a, wherefrom heading error representative signals are coupled to a maneuver controller 12 and a turn rate controller 13. A transition logic unit 14 receives heading error representative signals from the heading error detector 11a and course change signals from a course change detect unit 15 to operate switches 16 and 17. When the heading error exceeds 10° or the course change detector 15 indicates a course change greater than 3°, the transition logic 14 couples the output terminal 17a of the switch 17 to the output terminal 16a of the switch 16 so that the output signals from the turn rate controller 13 or the output signals of the maneuver controller 12 are coupled to mode switch 10 via limiters 19. Turn rate controller 13 receives signals from a turn rate knob 21 which, when on, provides a desired turn rate to the turn rate controller 13.

When the turn rate knob is off the transition logic 14 causes the switch 16 to couple rudder control signals from the maneuver controller 12 to the limiters 19 via the switch 17. The maneuver controller 12 provides rudder control signals that are proportional to the heading error. The proportionality constant and the rate time constant for this circuit is tailored to the ship on which the steering system is installed and is calibrated for two load conditions; lightly loaded and heavily loaded.

When the turn rate knob 21 is on, the transition logic 14 causes the switch 16 to couple rudder order signals from the turn rate controller 13 to the limiters 19 via the switch 17. Turn rate controller 13 provides rate control turns which are customized for the size and turning characteristics of the ship by calibration during sea trials. Once calibrated, the turn rate controller provides turn control rates in a range appropriate for the ship on which the system is installed. This control range may be a as low as 2.5° to 30°/min for large-sensitive containerships, or as high as 25° to 300°/min. for fast turning ships unaffected by role.

Figure 2:
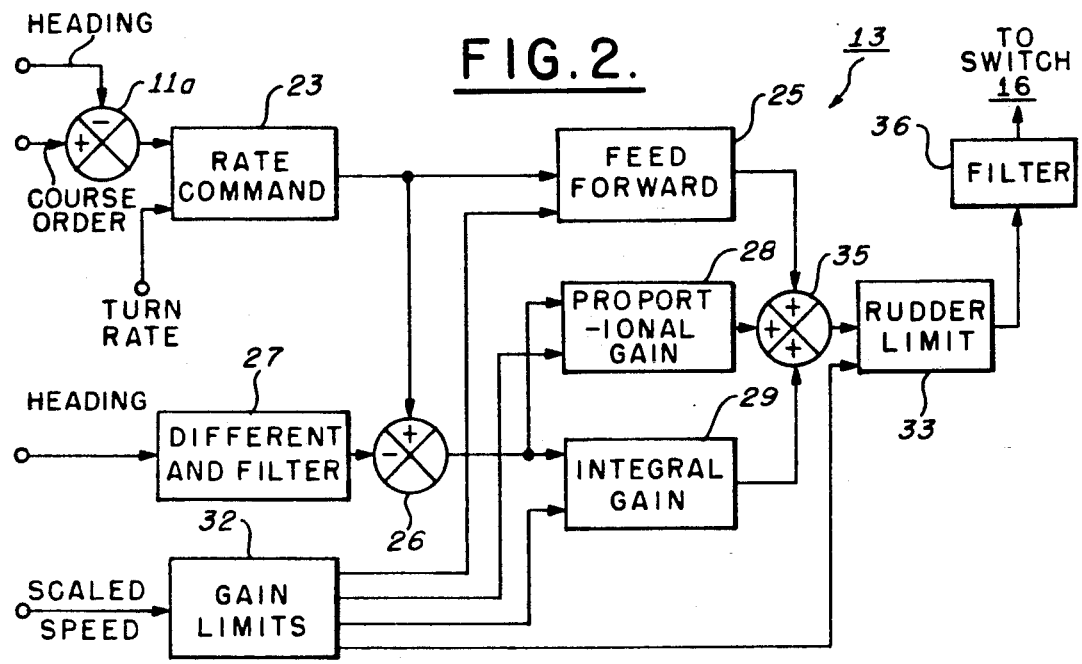
FIG. 2 a block diagram for the turn rate controller of FIG. 1.

Refer now to FIG. 2, wherein a block diagram of the turn rate controller 13 is provided. Heading error representative signals from the heading error detector 11a and turn rate signals from the turn knob 21 are coupled to a rate command circuit 23 which provides rate order signals to a feed forward gain device 25 and to a summation circuit 26 which also receives differentiated heading signals from a differentiator and filter 27. The summation circuit 26 provides signals representative of the difference between the differentiated heading signals and the rate command signals to a proportional gain circuit 28 and an integral gain circuit 29. Speed scale signals from a speed scale circuit 31 (FIG. 1) are coupled to a gain limits computation circuit 32 which establishes limits for the feed forward gain circuit 25, the proportional gain circuit 28, the integral gain circuit 29, and a rudder limit circuit 33. Output signals of the feed forward gain circuit 25, proportional gain circuit 28, and the integral gain circuit 29 are summed in summation circuit 35 to provide the rudder order signal which is coupled through the rudder order limiter 33 and a filter 36 to the limiters 19. Filter 36 filters the heading at 8 Hz at a time constant that is adjustable between ½ and 20 seconds. The longer time constants are chosen for small ships which experience high heading rate noise in moderate seas, while the typical time constant for large ships, which experience low heading rate noise, is ½ second. The time constants for the feed forward gain 25, the proportional gain 28 and the integral gain 29 circuits are calibrated as previously described for light and heavy ship loads during sea trails.

As previously discussed the turn rate controller 13 is activated by setting the turn rate dial 21 from off to desired turn rate or by changing the ship's course by 3° or more. The rate controller 13 gradually increases the control rate from the current heading rate up to an ordered turn rate. The speed at which the rate increases depends on a calibrated rise time which if set during sea trial for a light and heavily laden ship. The control rate changes from 0°/min to a maximum rate that is twice the rise time. The net effect is a fast increase to the ordered turn rate for ships without much roll and slow acceleration for roll sensitive ships. The rudder order is computed eight times per second to provide responsive control for small ships.

Figure 3A:
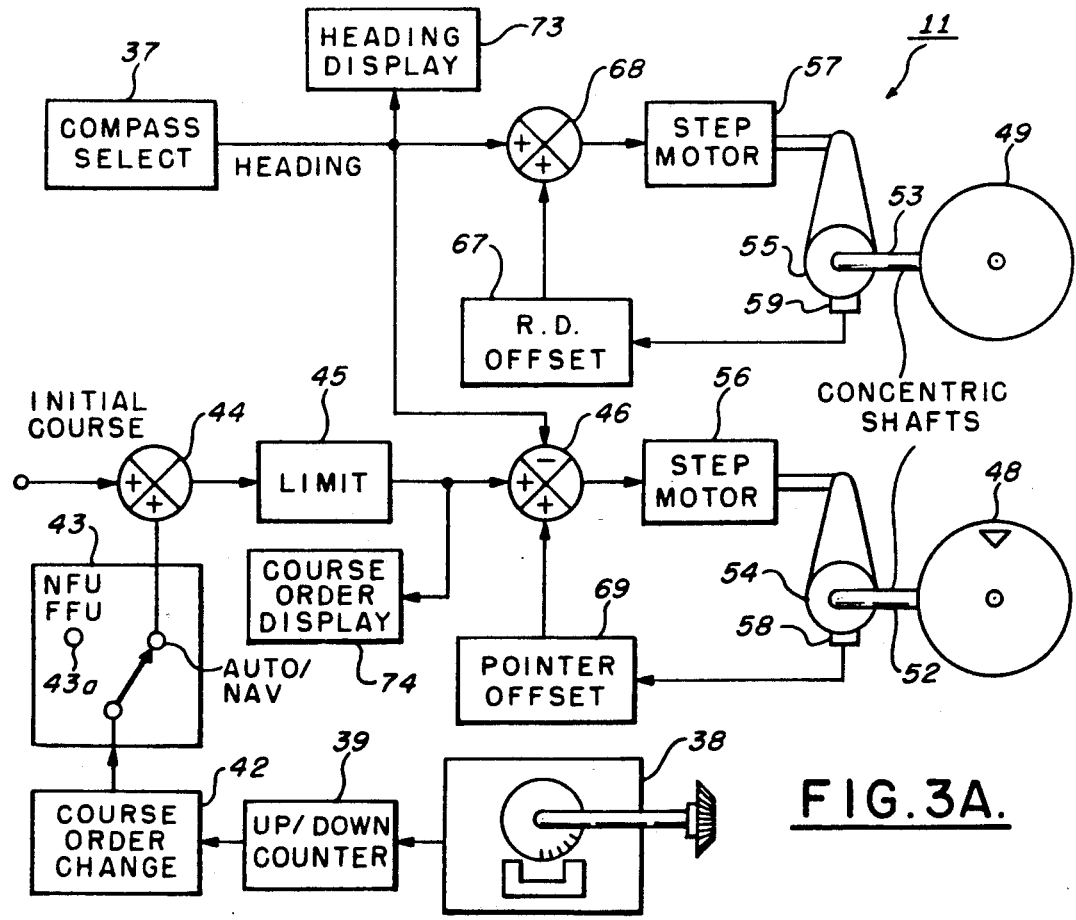
FIG. 3A is a block diagram of the heading repeater and course selector shown in FIG. 1.
Figure 3B:
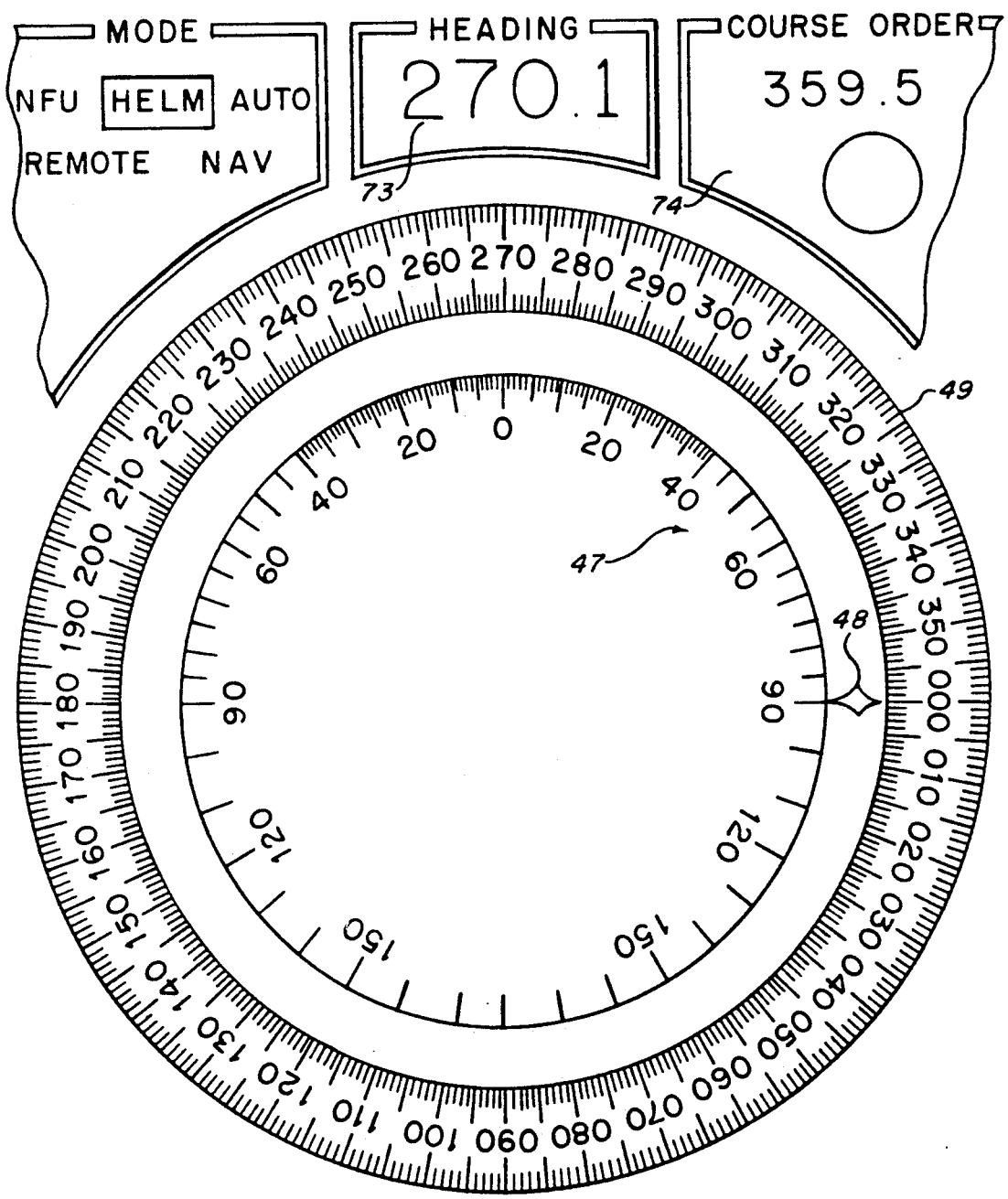
FIG. 3B is a representation of displays for the heading repeater and course selector.

Refer now to FIGS. 3A and 3B wherein a block diagram of the heading repeater and course selector 11 and the dials and digital displays associated therewith are respectively shown. Heading data is provided from a compass select circuit 37 which couples to the compass presently in use and synchronizes the heading representative signals with the signals received from this compass. Synchronization with signals from a multiplicity of compass types, such as 360X, 180X, 90X, or 1X synchro is provided. If a compass change is made the compass select circuit 37 automatically synchronizes to the new compass. A course order change command may be directed through an electro optical encoder 38 wherein the interruption of a light beam provides digital signals representative of the course order change to an up-down counter 39. The electro optical detector 38 operates in a manner to be explained with reference to FIG. 5B. Up-down counter 38 provides an up-down count to a course order change unit 42 wherefrom a course order change signal, in the Auto/Nav mode, is coupled through a switch 43 to a summation circuit 44 wherein the course order change signal is added to a signal representative of the initial course and the summed signal coupled to a limiter 45. New course order signals from the limiter 45 are coupled to a second summation circuit 46 to which the heading representative signals from the compass select unit 37 are also coupled. Summation network 46 determines the difference between the heading representative signal and the new course order signals and provides the heading error signal.

Figure 3C:
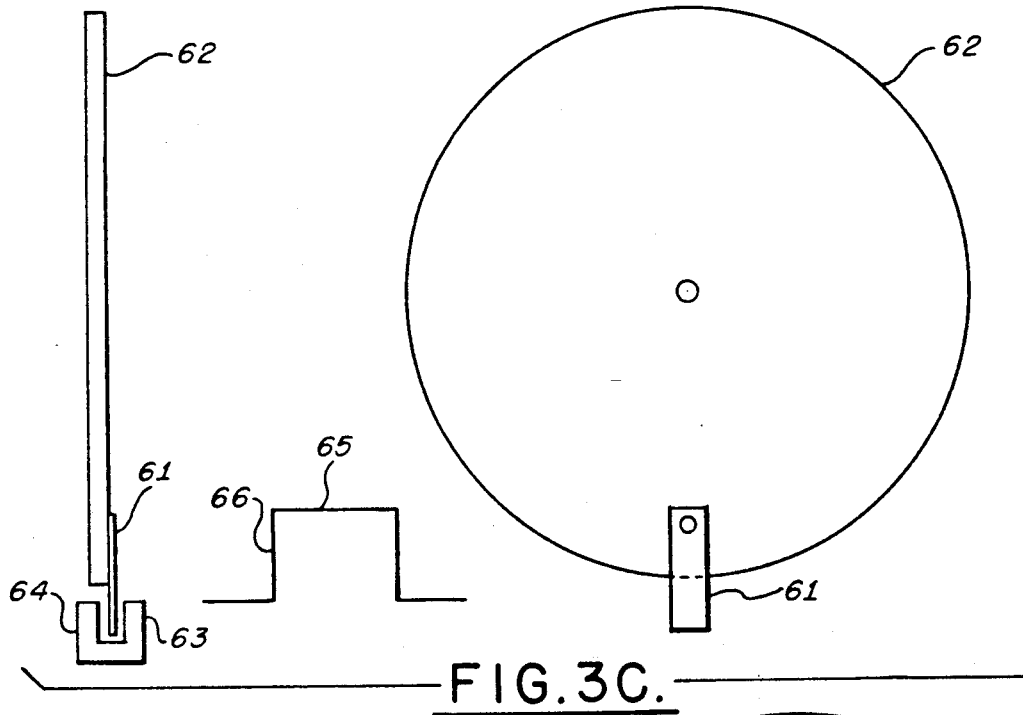
FIG. 3C is a diagram of a system for indexing the movable scale and movable pointer of FIGS. 3A and 3B.

Current ship's heading and ordered course are shown on rotary analog scales providing an indication of ship's direction, yaw during course keeping, and progress through a maneuver. Refer to FIG. 3B. A center heading error scale 47 is fixed while a course pointer 48 and a marked repeater scale 49 are movable. The pointer 48 and the marked repeater scale are separately driven by concentric shafts 52 and 53 (FIG. 3A), respectively. Shaft 52 is driven by a pulley 54 coupled to a step motor 56, while the shaft 53 is driven by a pulley 55 coupled to a step motor 57. The pulleys 54 and 55 are indexed by an index mechanisms 58 and 59, respectively. A representation of these index mechanisms is shown in FIG. 3C. An index tab 61 attached to a pulley 62 interrupts a light beam from an emitter 63 so that a detector 64 provides an electrical output pulse 65 with a leading edge 66. This leading edge 66 provides an electrical index for the pulley position. Refer again to FIG. 3A. This electrical index is utilized to provide an electrical signal, which is preset, to mechanically align the pointer and the zero calibration on the repeater scale with the zero position of the fixed scale when a zero heading error and a zero heading are provided. The offset signal which is provided by the repeater dial offset circuit 67 is added to the heading representative signal in adder circuit 68 to position the repeater scale 49 via the set motor 57, the pulley 55, and the shaft 53. Similarly, the pointer offset signal provided by a pointer offset signal circuit 69 is added to the heading error signal in adder circuit 46 to establish a drive signal for the step motor 56 that positions the pointer via the pulley 54 and shaft 52.

Refer again to FIG. 3B. The repeater scale is rotated by the mechanism described above until the heading is in alignment with the zero marking on the fixed scale 47, while the pointer is rotated to indicate the course order on the repeater dial 49. The heading is displayed digitally by a digital display 73 and the course order is displayed digitally by a digital display 74. The pointer is maintained on the course order as the repeater scale moves in response to the heading changes. When the maneuver is complete and the ship is on the new course, the pointer 48 and heading indicated on the repeater scale 49 are in alignment with the zero marking on the fixed scale 47.

Refer again to FIG. 3A. In NFU and FFU modes switch 43 is operated to switch the course order change to a blank terminal 43a so that the pointer is maintained at the lubber line, since course always tracks heading in these modes.

Refer again to FIG. 1. When the heading error is less than 10° and the turn rate knob 21 is operated to provide a course change order of less than 3°, the transitions logic 14 controls the switch 17 so that rudder order signals are provided to the limiters 19 from a heading keeping controller 18. This heading keeping controller may be of the type disclosed in U.S. Pat. No. 4,777,602 entitled "Digital Autopilot Controller For Marine Vessels" issued on Oct. 11, 1988 to Charles R. Wesner and assigned to the Assignee of the present invention. In accordance with U.S. Pat. No. 4,777,602, which is incorporated herein by reference, an up-down counter is incremented or decremented in accordance with a heading change order. The counter is also responsive to a step heading input signal. The counter is referenced to a zero value and converted to an analog control signal by a digital-to-analog converter. As the ship turns towards the new heading, the changing step heading input causes the counter to count back to zero.

During the Auto/Nav steering mode the rudder must be offset to compensate for external forces, such as weather, seaway effects, or any asymmetry in the ship or cargo which necessitates a non-zero average or mean rudder position to keep the ship on course. This bias is provided by a bias integrator, indicated as rudder auto bias 67 in FIG. 1. Whenever a significant course change is encountered the bias integrator 67 must quickly adapt to the changes in weather and seaway effects on the ship along a new course. A bias integrator which may be utilized for the rudder auto bias 67 is disclosed in U.S. Pat. No. 5,034,895 issued July 23, 1991, to Johnson, et al and assigned to the Assignee of the present invention. This application is incorporated herein by reference. In accordance with the Johnson, et al application the bias integrator functions during maneuver control when the course change is nearly complete. The point at which the integrator starts to function is determined by preset conditions on heading error, heading rate, and the derivative of the rudder order. If these conditions are not met, bias integration begins once heading error is continuously less than 10° for two minutes, or the heading keeping controller becomes active.

While the integrator 67 is not active, the bias retains its value pending update when the integrator is reactivated. Thus, integration history can be retained during small course changes with the maneuver controller 12 or rate controller 13. The bias is reset to a calibrated base line at the start of Auto/Nav steering and whenever the course is changed by over 30°. This base line may be set when the system is installed to compensate for permanent offsets due to ship asymmetry. If no asymmetries exist the base line is 0°. The integrator then filters heading error and computes incremental changes to the base line bias to adjust for cargo or temporary ship asymmetry, weather and seaway conditions.

The rudder order bias integrator 67 filter time constant is calibrated at installation for each load condition. Separate time constants are provided for maneuver and heading keeping control. The maneuver control time constant is also scaled for a ship's speed. The calibrated time constant applies during long periods of integrator activity. When the integrator is reactivated, a faster time constant is used, typically twice as fast as the normal value. The integrator ramps the controlling time constant from the initial small value up to the calibrated value. Both the initial time constant and ramping rate may be set at installation. The shortening of the filter time constant allows the integrator to compute the new bias at the end of a turn. The longer calibrated time constant avoids incorporating temporary heading deviations in the bias value while maintaining course.

Heading keeping and maneuver operations may be monitored by an off course alarm system shown as block 70 in FIG. 1. During the Auto/Nav mode the helmsman may select a heading error tolerance between 0° and 14° through an off course dial, not shown. To prevent false alarms, the heading error from the course order must exceed the heading error tolerance set by the helmsman for a time duration selectable between 0 to 40 seconds which is set at the installation of the off course alarm system (OCA). During course changes the heading monitoring functions are disabled to avoid false alarms during the maneuver. The OCA monitors the progress of the maneuver to detect failure of the steering system to adequately achieve the new course. In general, an alarm is set during a maneuver if the ship does not move quickly enough in the direction of the new course.

Figure 4A:
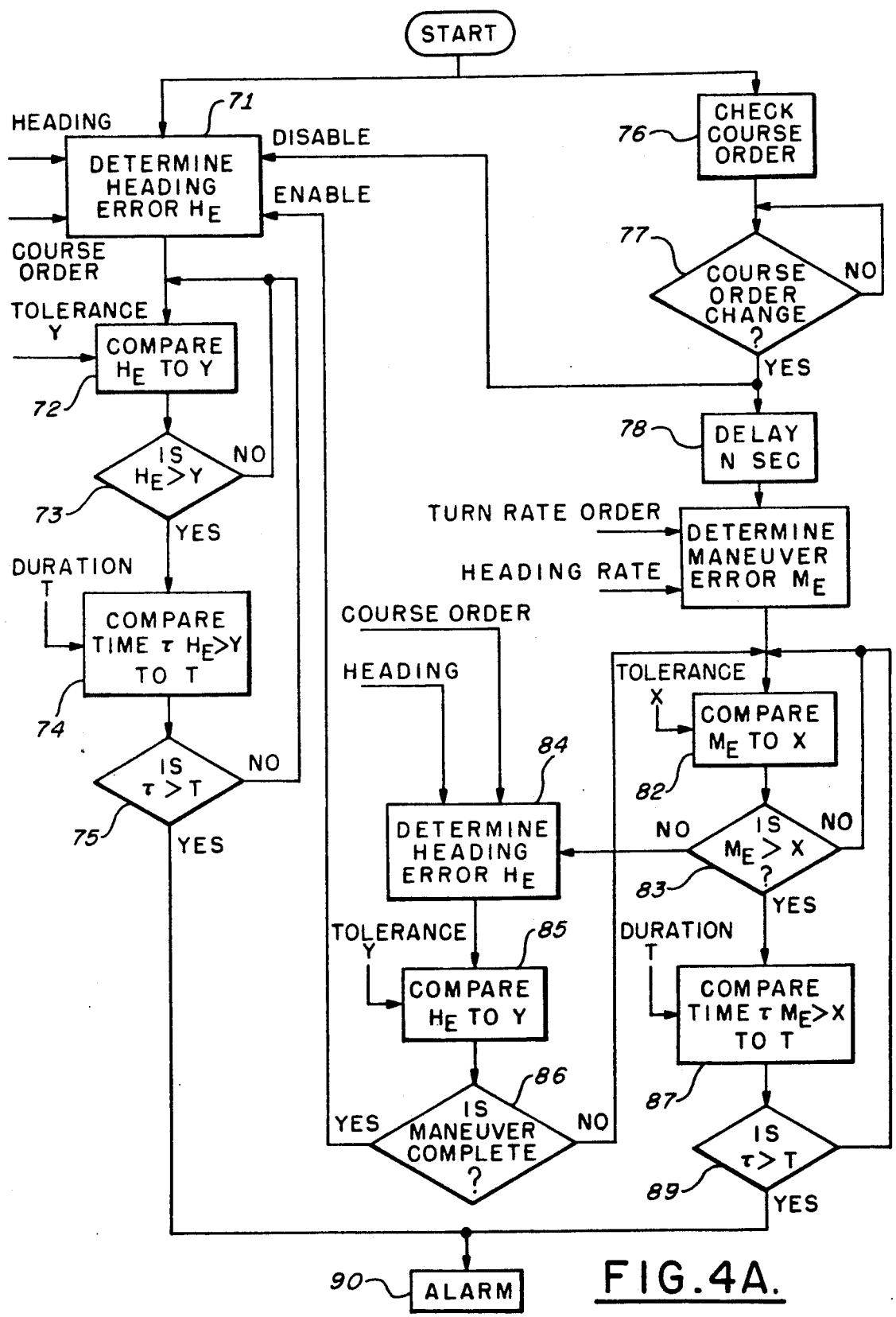
FIG. 4A is a flow chart for providing an off course alarm.

A flow chart for providing the off course alarm function is shown in FIG. 4A. When the ship is not in a maneuver, the heading is compared to the course order to determine the heading error $H_E$ by a computation 71. This heading error is compared to an off course tolerance Y which, as previously stated, is selected by the helmsman and may be between 0° and 14°, by a comparator 72. The results of the comparison are coupled to a decision function 73 which maintains the comparison of $H_E$ to Y if $H_E$ is less than Y. If $H_E$ is greater than Y a comparison is made, in comparator 74, of the time $\tau$ over which $H_E$ exceeds Y to the excessive heading duration T set for the OCA at installation. Should a course correction be made in the time less than T, the decision 75 has the system continue comparing $H_E$ to Y in the comparison network 72. Should $\tau$, however, be greater than T an alarm decision ensues.

The course order is monitored by the OCA in the circuit 76. If no course order change is detected the decision 77 continues the monitoring of the course order. Should, however, a course order change be detected, the determine heading error circuit 71 is disabled and a delay 78 of N seconds is provided to permit the ship to settle into the maneuver. This time is set at installation and is determined during sea trials. The ship's heading rate is compared to the turn rate order set by the helmsman in a comparison circuit 79 to determine the maneuver error $M_E$. This maneuver error is compared in a comparator 82 to an off course tolerance X, also set by the helmsman and which may be equal to the off course tolerance Y. If the decision 83 is that $M_E$ does not exceed X the comparison continues in comparator 82 and the heading is compared to the course order in a comparator 84 to determine the heading error $H_E$ which, in turn, is compared in comparator 85 to the tolerance Y. Should a determination 86 be made that $H_E$ is less than Y the maneuver is considered complete and the heading error determination circuit 71 is enabled. If, however, it is determined that $H_E$ exceeds Y the comparison $M_E$ to X continues. If the determination 83 is that $M_E$ exceeds X a comparison 87 is made of the time $\tau$ that $M_E$ exceeds X to the excessive heading error duration T. If the decision 89 determines that $\tau$ is less than T the comparison of $M_E$ to X continues. If, however, it is determined that $\tau$ exceeds T then the alarm 90 is sounded.

Figure 4B:
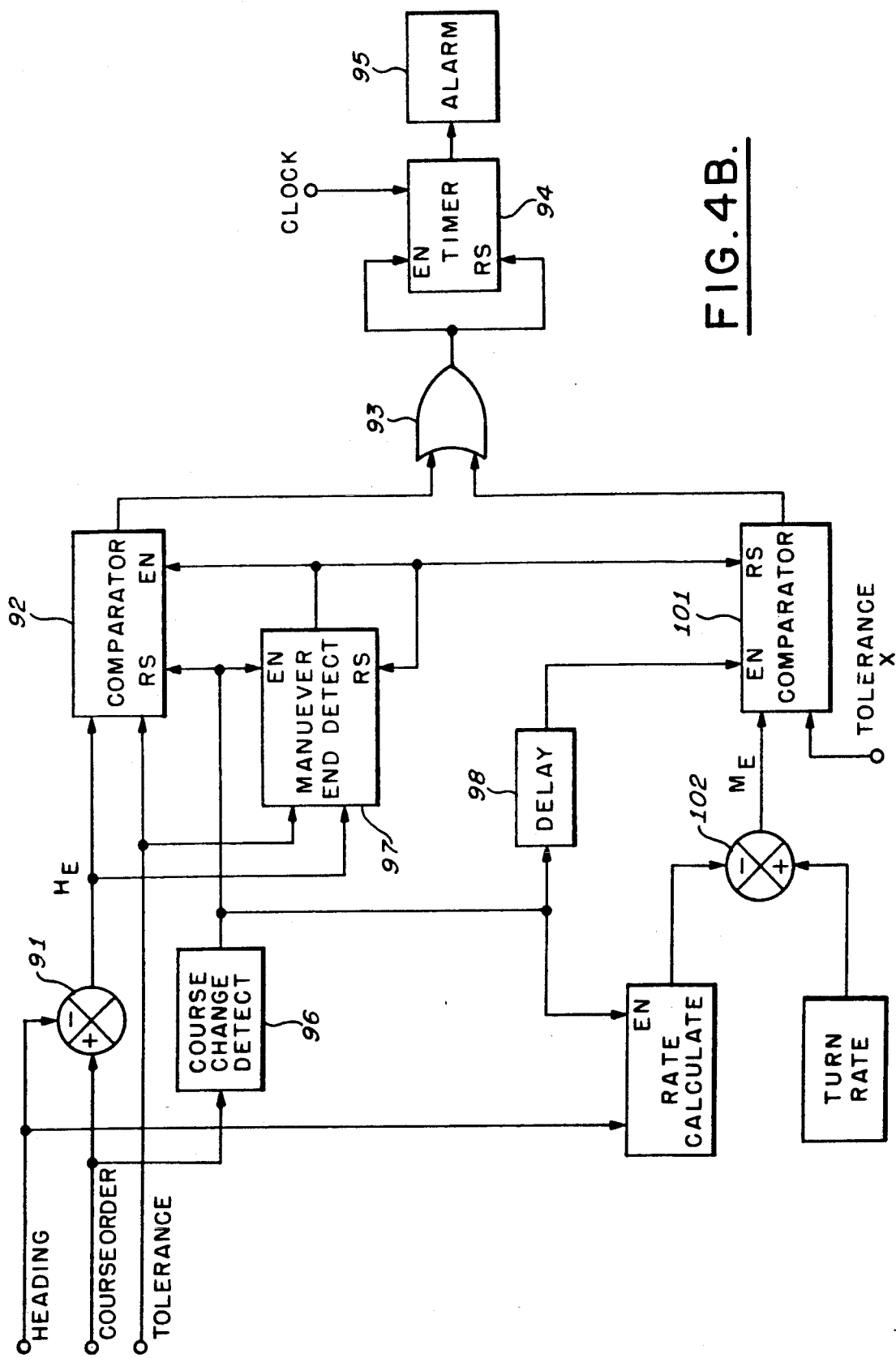
FIG. 4B is a block diagram of a circuit which may be employed for the off course alarm shown in FIG. 1.

A functional block diagram that may be employed to provide a system in accordance with the flow chart of FIG. 4A is shown in FIG. 4B. Heading and course order representative signals are coupled to a summation network 91 wherefrom a signal representative of the difference therebetween is coupled to a comparator 92 wherein it is compared to a signal representative of the off course tolerance set by the helmsman. Comparator 92 is initially set at a low level and when the heading error representative signal exceeds the off course tolerance representative signal a low to high transition occurs which is coupled through an OR gate 93 to enable a timer 94 which, after a time delay of T seconds causes an alarm 95 to be sounded. Should the heading error representative signal fall below the off course tolerance representative signal prior to the expiration of T seconds a high to low transition occurs at the output of the comparator 92 which is coupled through the OR gate 93 to reset the timer 94, thus preventing an alarm from sounding.

When a course order change is commanded a course change detection circuit 96 provides a signal that resets the comparator and enables a maneuver end detection circuit 97. The course change detection circuit 96 also couples a signal to a delay line 98 which delays an enable signal to a comparator 101 for N seconds, the maneuver settling time established at the system installation. The difference between signal representative of the turn rate established by the helmsman and a signal representative of the heading rate calculated for the maneuver is coupled from a summation network 102 to the comparator 101 wherein it is compared to a maneuver tolerance representative signal X. Should $M_E$ exceed X a low to high transition occurs at the output terminal of the comparator 101 which is coupled through the OR gate 93 to enable the timer 94 as previously described. If before the expiration of T seconds $M_E$ becomes less than X a high to low transition occurs at the output of the comparator 101 which resets the timer 94 and prevents the sounding of the alarm 95. If, however, the high to low transition does not occur within T seconds timer 94 remains enabled and an alarm 95 is sounded at the expiration of T seconds.

After the maneuver end detection circuit 97 has been enabled comparisons between the heading error representative signal and the off course tolerance signal Y are preformed therein. When the heading error representative signal $H_E$ is less than the off course tolerance representative signal Y the maneuver end detection circuit 97 provides a signal to enable comparator 92 and to reset comparator 101, whereafter the OCA monitors ship's heading relative to the course order.

When the switch 10 of FIG. 1 is the Helm position (FFU) rudder orders from a manually controlled helm are provided to the servo amplifiers 20. The helm system, shown in FIG. 5A, includes a wheel 105 on a shaft 106 which is coupled to an optical rotary position encoder 107. As the wheel is rotated electrical signals from the optical encoder 107 are coupled to an up/down counter 108 which provides an upcount for a clockwise rotation of the wheel and a downcount for counter clockwise rotation of the wheel. Signals from the up/down counter 108 are then coupled to a rudder order change circuit 109 wherefrom rudder order signals for updating an initial rudder order are coupled to a summation circuit 110.

Figure 5B:
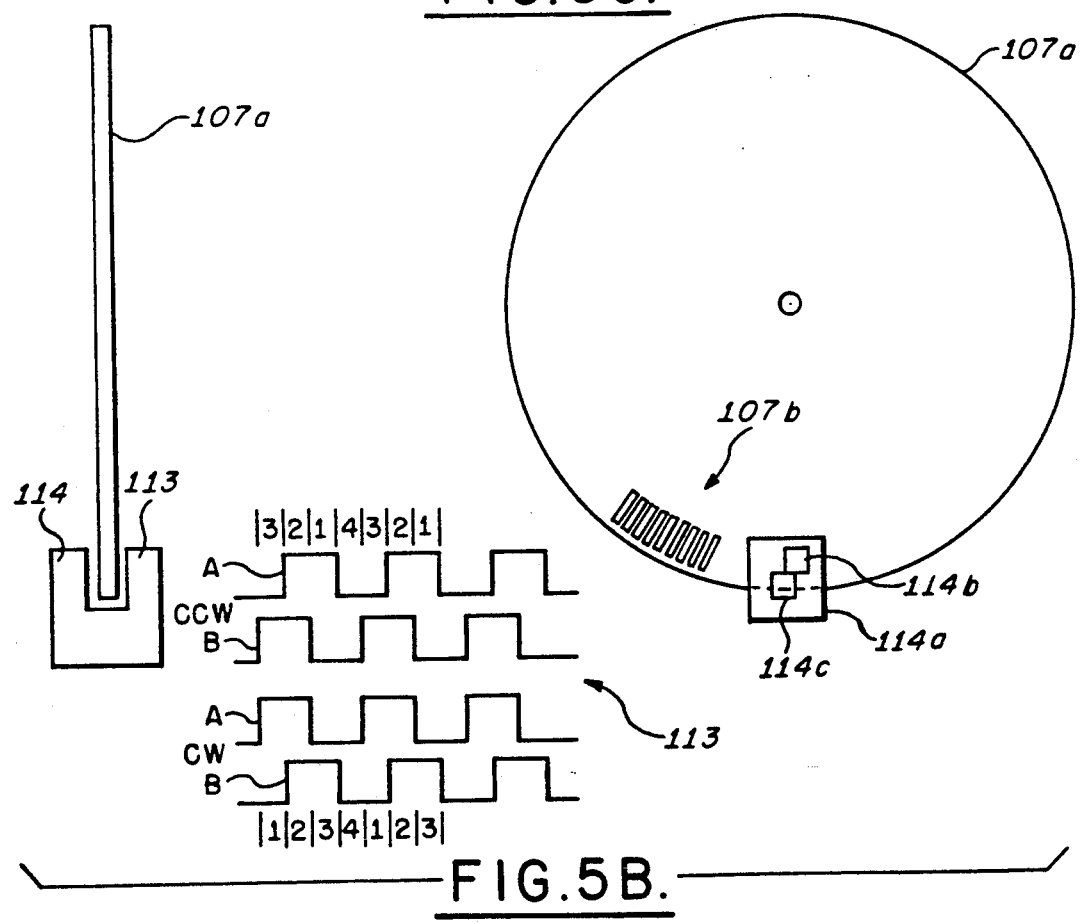
FIG. 5B is a diagram of an optical encoder which may be utilized for the optical encoder of FIG. 5A.
Figure 5A:
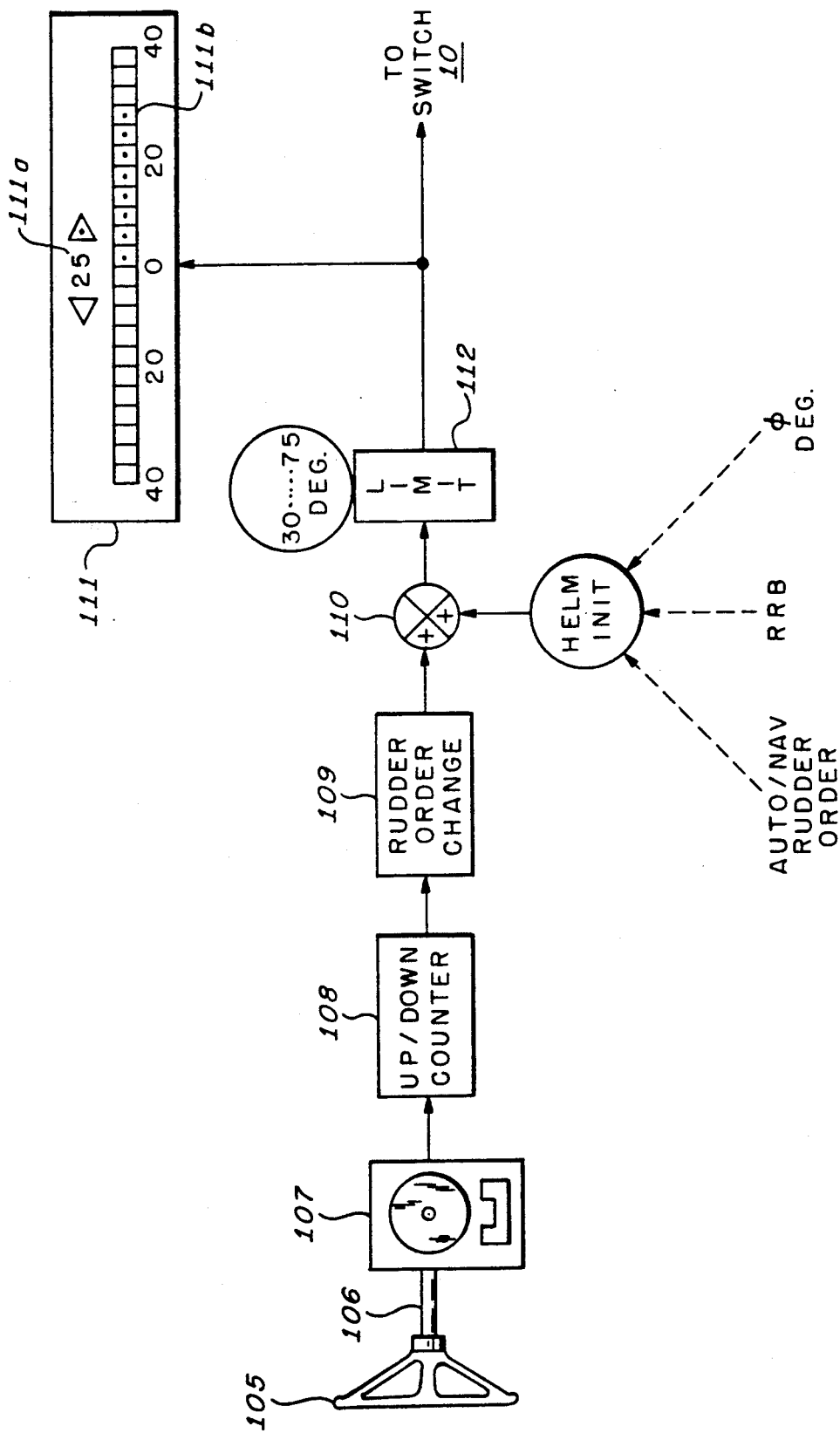
FIG. 5A is a block diagram of a digital helm which may be employed as the helm of FIG. 1.

Referring to FIG. 5B wherein the optical rotary position encoder is illustrated. A disk 107a, having equiangular spaced windows 107b at its perimeter is coupled to rotate with the shaft 106. Disk 107 rotates between a light emitter 113 and light detectors 114. A mask 114a, having offset windows 114b and 114c, respectively, cause electrical waveforms A and B to be provided by the detectors 114. The waveforms A and B are in quadrature as illustrated at 113a and 113b. Waveform A and waveform B levels represent four cyclically repeated states denoted as 1, 2, 3, and 4. In state 1, waveform A is binary ONE and waveform B is binary ZERO. In state 2, both waveforms are binary ONE. In state 3, waveform A is binary ZERO and waveform B is binary ONE and in state 4, both channels are binary ZERO. The incremental position of the encoder is tracked by detecting transitions in the state and incrementing or decrementing an up/down counter to provide a digital readout of the angle. The direction of rotation is decoded by comparing the previous state to the current state and controlling the counter accordingly. For example, the counter is controlled to count up for state transitions in the order 1, 2, 3, 4, 1, etc. and is controlled to count down for state transitions in the order 1, 4, 3, 2, 1, etc.

The initial rudder order coupled to the summation circuit 110 may be the rudder order current in a previous steering mode, the rudder order corresponding to the instantaneous rudder position at the switch over to helm steering, or the rudder order corresponding to 0° regardless of the current rudder order or rudder position. The first two initialization choices result in "bumpless transfer" from the previous steering mode to the Helm mode. Since large rudder position changes are avoided. Third initialization choice simplifies operation for the helmsman who traditionally prepositioned an analog helm at 0° before selecting the helm mode.

As the helmsman moves the wheel 105, the optical sensor the up/down counter 108 and rudder order change unit 109 provide the rudder order update to the summation network 110. A rudder order indicator (ROI) 111 provides a numerical display 111a and a digital bar graph display 111b of the current rudder order resolved to the closest 1°. The steering system changes and maintains the ship's rudder at the displayed rudder order selected by the helmsman. The rudder order display 11 in FIG. 5 indicates a rudder order of 25° to the right.

The wheel may be designed so that one clockwise rotation increases the rudder order by 20° to the right and one counterclockwise rotation decreases the rudder by 20° to the left. The wheel has no mechanical stops and may be customized for the hard over rudder position of the ship by coupling the rudder order from the summation network 110 through a limiter 112 which limits the rudder order signal to that corresponding to the heart over rudder position for that ship. The limits for the limiter 112 may be set for signals corresponding to rudder orders between 30° and 75°. Since rotation of the wheel only provides increments of left or right rudder changes, any wheel motion in the opposite direction from the hard over position causes an immediate reduction in rudder order.

Figure 6:
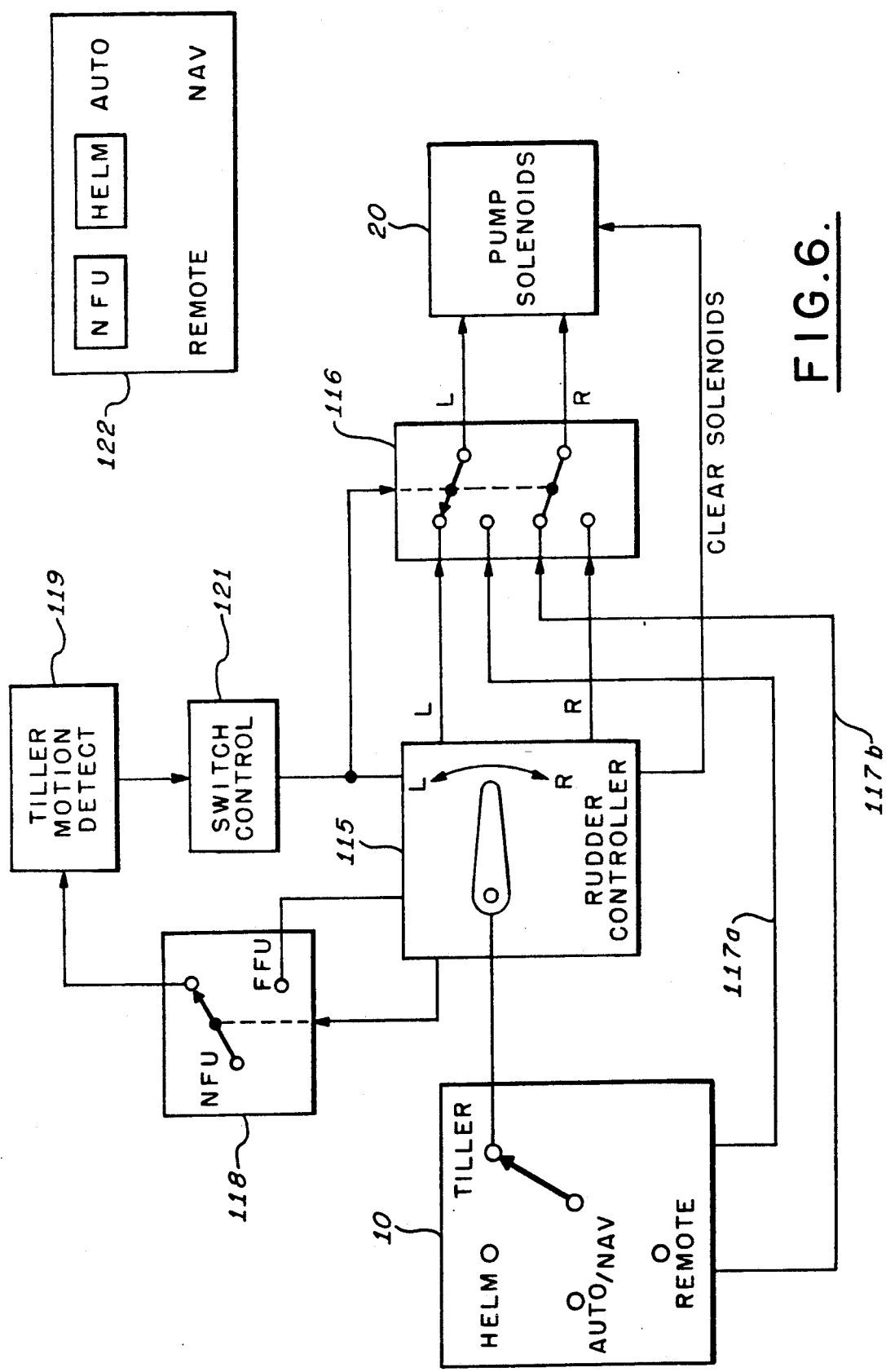
FIG. 6 is a block diagram of a servo amplifier.

In the tiller non-follow up (NFU) mode rudder movement is achieved by providing left/right control signals directly to the pump solenoids. Rudder position feedback is not provided so that the rudder position is open loop controlled and achieved through an independent rudder angle indicator. Refer now to FIG. 6. When switch 10 is in a tiller position, a NFU rudder controller 115 is energized, a switch 116 is activated to couple the left and right rudder control signals to the pump solenoids, and all left/right commands in the servo amplifier (FFU control) are cleared to stop the rudder. When in the tiller mode, the rudder moves right when the stick on a rudder controller is pulled right, the rudder moves left when the stick on the rudder controller is pulled left, and the rudder holds its position when the devise is released. The rudder controller 115 remains in control until another steering mode is selected, at which time the switch 116 is activated to coupled the pump solenoids 20 to lines 117a and 117b on which full follow up (FFU) rudder control signals are provided.

Emergency takeover is provided when the steering system is in the Helm or Auto/Nav modes by automatically establishing the Tiller mode when the stick on the rudder controller 115 is moved. A signal indicating motion is coupled by a switch 118 to a tiller motion detector 119, wherefrom a motion detect signal is coupled to a switch control 121 which activates the switch 116 to couple left and right rudder control signals from the rudder controller 115 to the pump solenoids. The switch 118 is normally in the FFU position but is switched to decouple the tiller motion detector 119 from the rudder controller 115 when the steering system is in the Tiller mode. At installation the tiller motion detector 119 and the switch control 121 may be set to Jog or to Force the steering system into the NFU mode in an emergency takeover. Jog NFU becomes active when the operator moves the NFU device in any steering mode except Tiller. When Jog takeover is initiated a mode indicator shows that NFU is in operation an also shows the mode from which control was taken. During Jog emergency takeover the current helm order remains in effect and additional left or right steering is provided by the rudder controller 115. When the rudder controller is released the initial steering mode is reestablished and steering continues with the course order of the initial steering mode.

Like Jog NFU, Force NFU becomes active when the rudder controller 115 is moved when the system is in Helm or Auto/Nav modes. If the system is set for Force NFU, however, the mode indicator changes to NFU and mode switch 10 is moved to the tiller position. The system remains in the Tiller mode even after the stick of the rudder controller 115 has been released. To return to the previous steering mode it is necessary for the operator to change the mode switch 10 to the desired steering mode.

Figure 7A:
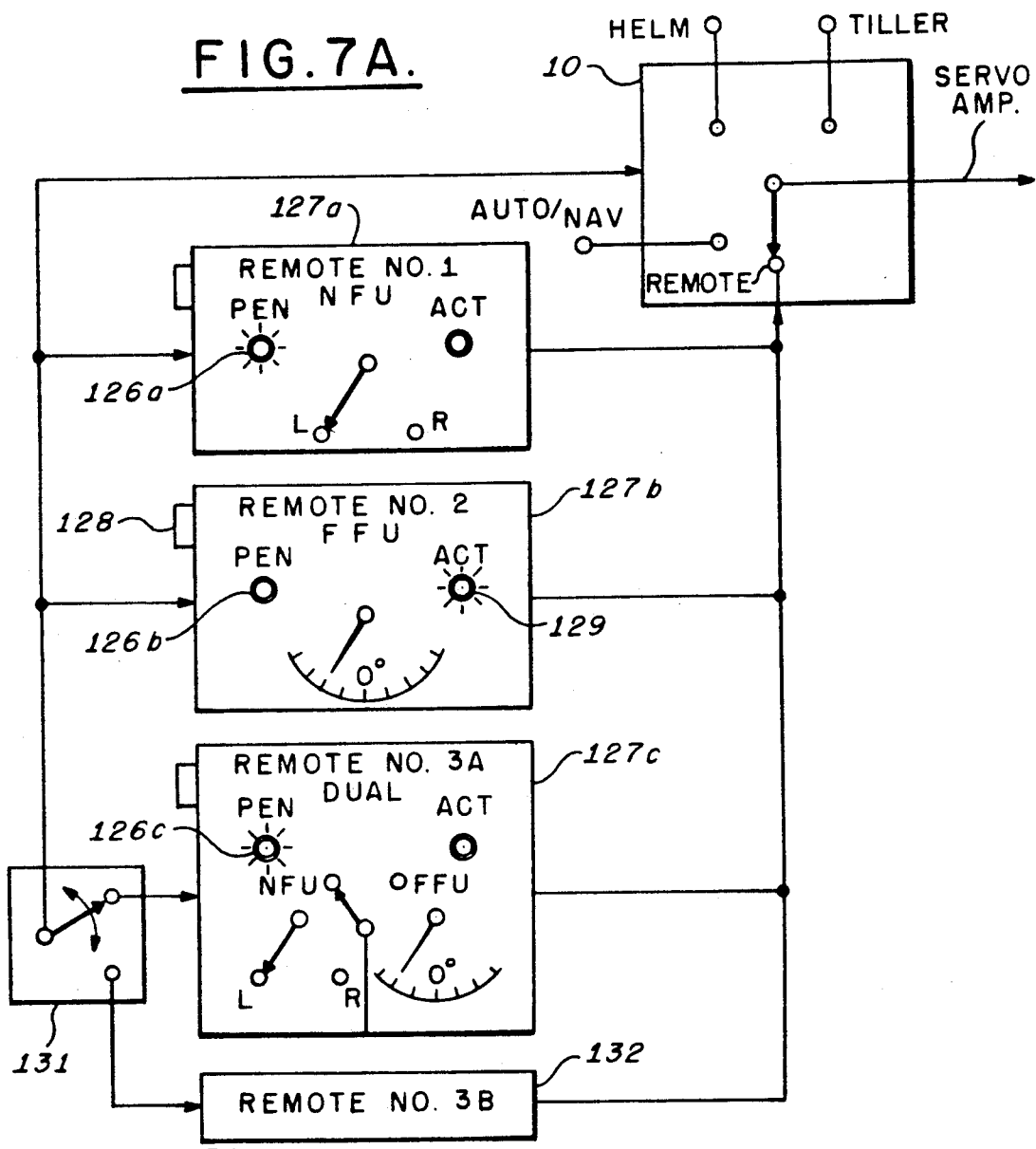
FIG. 7A is a block diagram of a multiplexing system for combined remote stations.

The steering system of the present invention may have a multiplicity of remote control stations. These remote stations may be configured to operate in either the Helm, Tiller, or either Helm or Tiller modes. A remote station is chosen for ship control via a multiplex system when the control switch 10 is in the remote position. FIG. 7A is a block diagram of a multiplex system containing three selectable remote stations wherein the third station is selectable between one of two remote stations. When the switch 10 is set to the remote position, pending lights 126a, 126b, and 126c at each of the remote stations 127a, 127b, and 127c, respectively, begin to flash, rudder control is maintained with the prior control system until an enable button 128 at the selected remote station is pressed to enable that station. When a station is enabled the pending light in that station goes out and an active light 129 goes on. At this time steering is controlled by the mode configured at the remote station. As indicated in FIG. 7A the second remote station is activated and provides FFU steering control.

As shown in FIG. 7A the three remote stations 127a, 127b, and 127c respectively provide NFU, FFU, and selectable NFU or FFU steering control. To transfer control from one of the remote stations to another remote station, the enabled button at the new remote station is pressed and control is transferred to that station. The active light for the newly enabled station is then lit and the pending lights at the other stations remain flashing.

Though a multiplex system for only three remote stations is shown in FIG. 7A, it should be understood that this is not a limitation and that additional stations may be included in the multiplex system. If, however, it is desired to have a standby remote station which may be substituted for one of the remote stations on the multiplex system a switch 131 may be provided to decouple one of the remote stations in the multiplex network as, for example, multiplex station 127c, and couple the standby station 132 to the multiplex system.

Figure 7B:
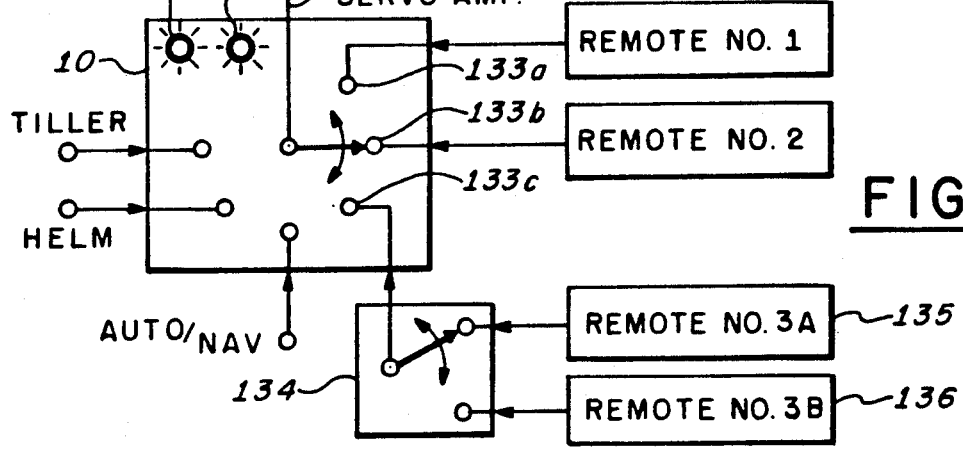
FIG. 7B is a block diagram of a multiplex system for dedicated switch position remote station selection.

Another remote station multiplex system that may be employed is shown in FIG. 7B. In this configuration each remote station has a dedicated switch position in the mode switch 10. Three remote switch positions 133a, 133b, and 133c are shown with an auxiliary switch box 134 for selecting between one of the remote stations 135 and a standby remote station 136. When one of the remote stations is selected rudder orders from that station are coupled to the servo amplifiers. Lights may be provided at each of the remote stations to indicate which of the remote stations is active. When a station is selected at the mode switch 10 its active light is lit while all others remain out.

Since, in this configuration, the station becomes active immediately after its selection at the switch 10, the selected remote station must be manned prior to activation. This situation may be eliminated with the incorporation of pending and active modes in the multiplexer. When a remote station is selected at switch 10, rudder control is maintained at the current rudder order until an enable button at the selected station is pressed. A remote indicator light 137 at the mode switch 10 and a pending light 138, which may be provided at the mode switch 10 flash until control is transferred to the remote station. When the station is activated by pressing the enable button at the remote station the remote indicator light becomes steady, the pending light goes out, and an active light at the selected station goes on. To select another remote station, the control at the present remote station is safely positioned and a new remote station is selected at the switch 10.

Figure 8A:
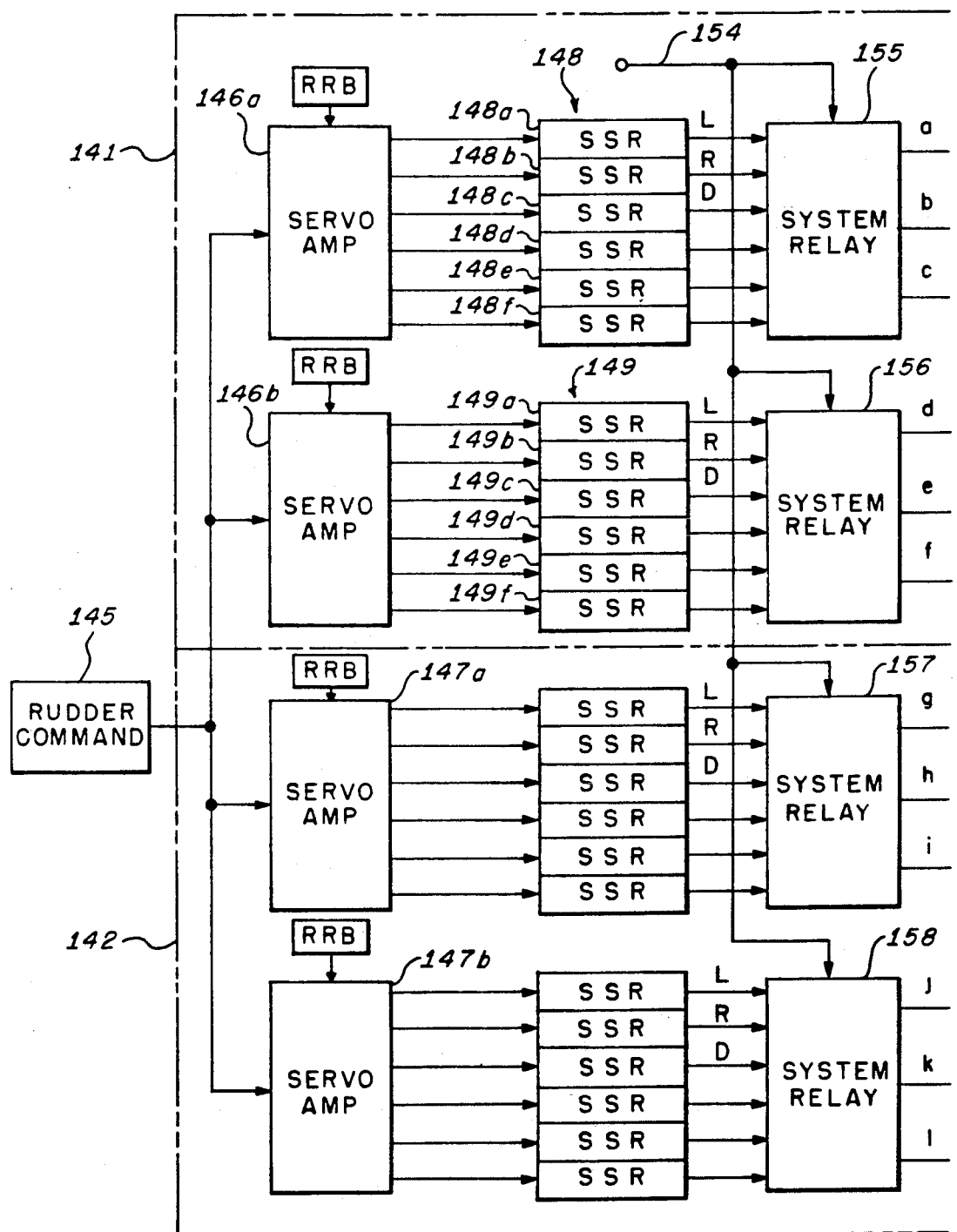
FIGS. 8A, 8B, 8C, and 8D are block diagrams of rudder controllers that may be provided as the servo amplifiers of FIG. 1.
Figure 8B:
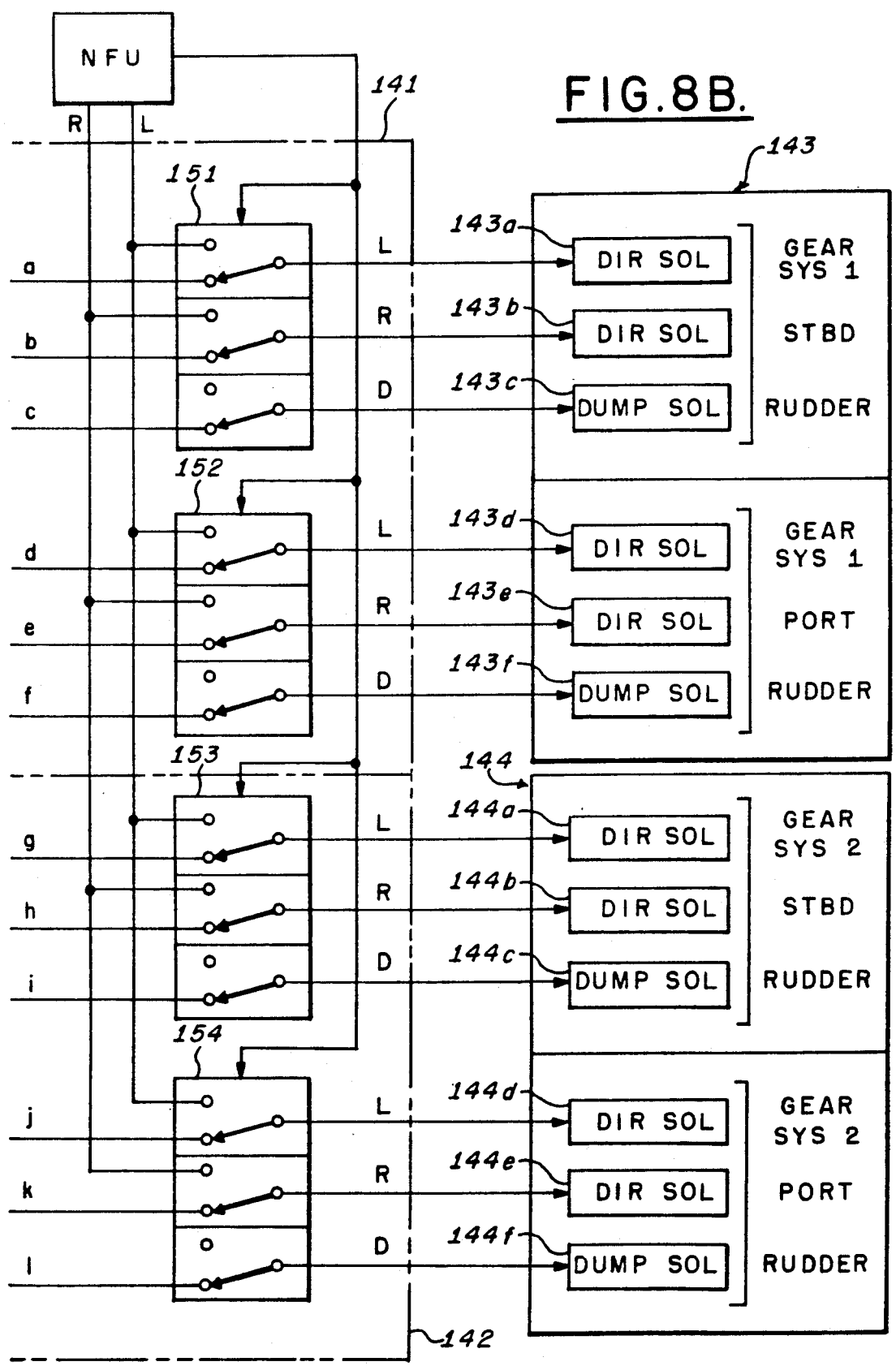
Figure 8C:
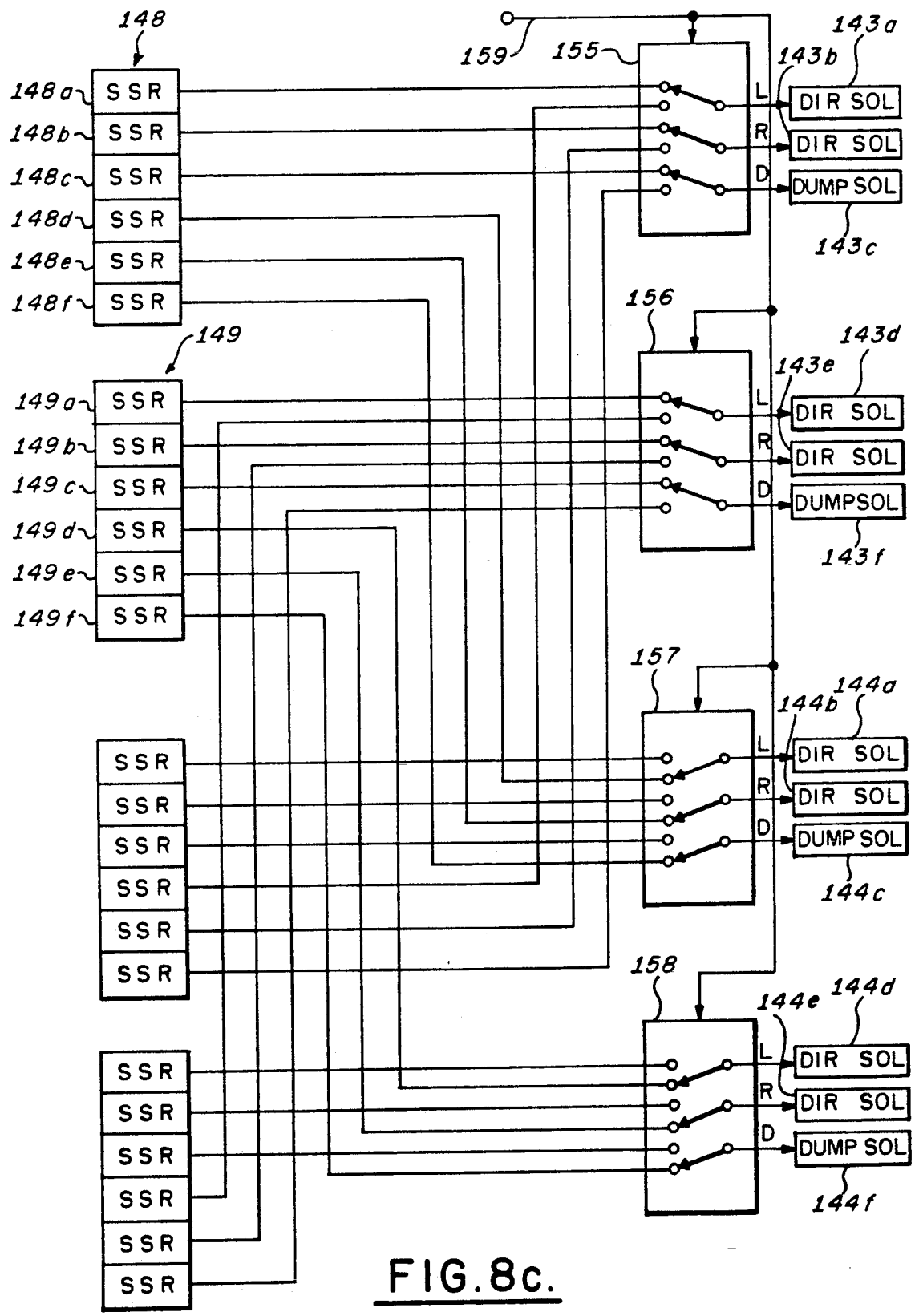

Rudder movement is provided by the steering system through hydraulic pumps regulated by a servo control unit shown in FIGS. 8A, 8B and 8C. Referring to FIGS. 8A and 8B, the servo unit includes two identical pilot systems 141 and 142 and two identical steering gear systems 143 and 144. Though only one pump control unit may be on at a time the steering gear systems 143 and 144 may be individually or simultaneously coupled to the rudders. Each of the gear systems provides independent control for starboard and port rudders for dual rudder configurations. The pump control units provide directional controls to solid state relays (SSR) which control pump solenoids in the steering gear systems to move the rudders right and left and to provide a dump signal for control of a pump solenoid to increase the rate of left/right rudder movement. Rudder control signals in accordance with the heading error are provided by rudder command unit 145 to servo amplifiers 146a and 146b in pump control unit 141 and to servo amplifiers 147a and 147b in pump control unit 142. Servo amplifiers 146a and 147a are associated with the starboard rudder in a dual rudder system and receive rudder repeat back signals from the starboard rudder. Similarly, servo amplifiers 146b and 147b are associated with the port rudder and receive rudder repeat back signals from the port rudder. Assume that pump control unit 141 is the activated pump control unit. The servo amplifiers 146a and 146b provide the signals to respectively control solid state relays sets 148 and 149. As will be explained, four stages of operation may be provided; stages one and two provide directional control to the pump solenoids, while stages three and four control pump solenoids which increase the flow of hydraulic fluid to make the rudder move faster. The servo amplifier 146a provides signals to SSR 148a, 148b, and 148c which may be coupled to respectively control the left directional solenoid 143a, the right directional solenoid 143b, and the dump solenoid 143c of the starboard rudder control gear set 143. Similarly, SSR 149a, SSR 149b, and SSR 149c of set 149 may be coupled to respectively control the left directional solenoid 143d, the right directional solenoid 143e, and the dump solenoid 143f of the port rudder control gear set 143. The three remaining solid state relays, 148d, 148e, and 148f of the set 148 and the three remaining relays, SSR 149d, 149e, and 149f of the set 149 may be utilized to control the directional and dump solenoids of the starboard and port rudder control gear system 144. With the NFU switches 151 through 154 set for FFU rudder control, system relay switches 155–158 may be set to provide four stage pump operation.

Refer now to FIG. 8C. A signal on line 159 sets the system relay switches 155 through 158 to couple SSR 148a, SSR 148b, and SSR 148c respectively to directional solenoid 143a, directional solenoid 143b, and dump solenoid 143c of the gear system 143. The remaining three solid state relays of the solid state relay set 148, SSR 148d, SSR 148e, and SSR 148f, are coupled through the switch 157 to respectively control directional solenoid 144a, directional solenoid 144b, and the dump solenoid 144c of the gear system 144 to provide additional control of the starboard rudder. Similarly, the remaining three solid state relays, SSR 149d, SSR 149e, and SSR 149f of the set 149 are coupled through switch 158 to respectively control the directional solenoid 144d, the directional solenoid 144e, and the dump solenoid 144f of the gear system 144 to provide additional control of the port rudder. In this configuration first stage rudder control for the starboard rudder is provided by the left directional solenoid 143a and the right directional solenoid 143b of the first gear system 143. This stage control is implemented for rudder errors that are less than 3°. When the rudder error exceeds 3°, the second stage rudder control is implemented by activating the left directional solenoid 144a and the right directional solenoid 144b of the second gear system 144. Should the rudder error exceed 5° the third stage rudder control is implemented by energizing the dump solenoids 143c of the first gear system 143 and when the rudder error exceeds 7° the fourth rudder control stage is implemented by energizing the dump solenoid 144f of the second gear system 144. The stages are added one at a time at ¼ second intervals to prevent hydraulic shock which may occure when excessive fluid flow is demanded. In a similar manner stages are removed one at a time as the rudder error is reduced to zero. The fourth stage is removed when the rudder error becomes less than 6°, the third stage is removed when the rudder error becomes less than 4° and the second stages is removed when the rudder error becomes less than 2°. Stage implementation for the port rudder is implemented in the same manner as that just described for the starboard rudder. It should be recognized that the rudder error angles at which the various stages are energized and turned off are arbitrary and may be set for any suitable rudder angle errors at system installation.

Figure 8D:
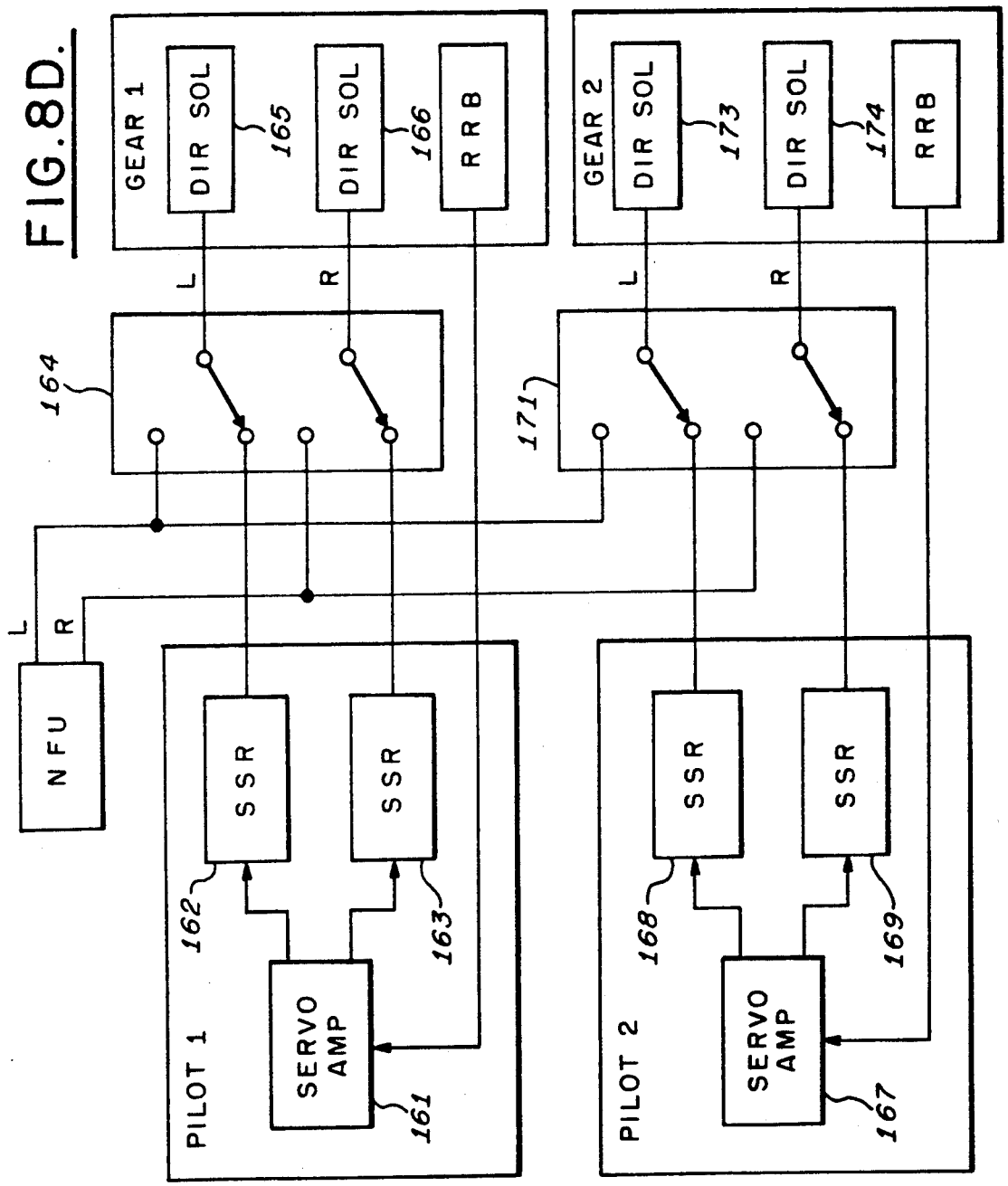

It should also be recognized that the rudder control system may be configured in accordance with the ship's steering system. Refer to FIG. 8D wherein a configuration is shown for a single flow pump, single rudder configuration. As shown in the figure, only one servo amplifier is utilized in each of the pilot systems. Servo amplifier 161 provides signals to solid state relays 162 and 163 which, with the NFU switch 164 set for FFU rudder control, respectively control directional pump solenoids 165 and 166 in gear system 1. Similarly, servo amplifier 167 in the second pilot provides signals to solid state relays 168 and 169 which, with NFU switch 171 in the FFU position, respectively control directional pump solenoids 173 and 174 in gear system 2.

The NFU switches 151 through 154 in FIGS. 8A and 8B and NFU switches 164 and 171 in FIG. 8C are operated as previously described, and may be set for either emergency Jog or Force control.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A ship steering system having rudder position means for positioning at least one rudder and a helm coupled to the rudder position means wherein the helm comprises:
   a wheel continuously rotatable through multiples of 360°;
   encoder means responsive to angular movement of said wheel for providing electrical rudder order signals for said at least one rudder;
   limit means coupled to receive said electrical rudder order signals from said encoder means for providing said electrical rudder order signals within preset electrical signal limits which are representative of right and left hardover positions of said at least one rudder; and
   means coupled to said rudder position means and responsive to said electrical rudder order signals provided by said limit means for positioning said at least one rudder between said right and left hardover rudder positions.

2. A ship steering system in accordance with claim 1 wherein said encoder means includes:
   electrical pulses means coupled to said wheel for providing a plurality of electrical pulses, said plurality being of a number that is representative of an angular rotation of said wheel;
   means for counting said plurality of electrical pulses, thereby providing a pulse count;
   means responsive to said pulse count for providing a rudder order change signal;
   means for providing an initial rudder order signal representative of an initial rudder position; and
   means for adding said rudder order change signal to said initial rudder order signal.

3. A ship steering system in accordance with claim 1 wherein one 360° rotation of said wheel establishes a rudder order change signal representative of a predetermined rudder angle change, said rudder order change signal being less than said preset electrical signal limit.

4. A ship steering system in accordance with claim 1 wherein said preset electrical signal limits of said limit means may be selected from a range between 30° and 75°.

5. A ship steering system in accordance with claim 1 wherein said electrical pulses means is an electro-optic encoder comprising:
   source means for providing a light beam;
   detector means for detecting light signals;
   modulation means coupled to and rotatable with said wheel, positioned between said source means and said detector means, and having equiangularly spaced light windows for passing light from said source means when one of said windows is aligned with said light beam, thereby providing a modulated light beam; and
   mask means, positioned between said detector means and said modulation means, having a first and second mask windows, said first and second mask windows being stationary with an angular offset therebetween and located for alignment with said modulated light beam, said first mask window for providing a first modulated light signal to said detector means and said second mask window for providing a second modulated light signal to said detector means, said first and second modulated light signals having a phase relationship therebetween determined by said angular offset.

6. A ship steering system in accordance with claim 5 wherein said detector means provides a first square wave electrical signal in response to said first modulated light signal and a second square wave electrical signal in response to said second modulated signal, said first and second square waves having said phase relationship, said first square wave leading said second square wave for one direction of rotation of said wheel and said second square wave leading said first square wave for a direction of rotation of said wheel opposite said one direction and wherein said counting means is responsive to said first and second square waves lead-lag relationship and counts up for said one direction of rotation and counts down for said direction of rotation opposite said one direction of rotation.

7. A ship steering system in accordance with claim 6 wherein six electrical pulse counts by said counter is representative of 1.4° of said wheel rotation.

8. A ship steering system in accordance with claim 6 wherein said preselected phase relationship is 90° so that said first and second square waves are in quadrature.

9. A ship steering system having means for positioning at least one rudder and a heading repeater/course selector, wherein said heading repeater/course selector includes:
   a fixed circular heading error angle scale;
   a rotatable circular heading angle scale concentric with said fixed circular heading error angle scale and rotatable for aligning heading angle with an index on said heading error angle scale; and a pointer positioned between said fixed circular heading error angle scale and said rotatable circular heading angle scale, said pointer being moveable on a circle concentric with said fixed circular heading angle scale to indicate course order on said heading angle scale.

10. A ship steering system in accordance with claim 9 wherein said heading repeater further includes indexing means coupled to said rotatable heading angle scale and said pointer for providing indexing signals for said rotatable circular heading angle scale and said pointer, said indexing signals utilized for aligning said pointer and said rotatable circular heading angle scale with said fixed circular heading error scale.

11. A ship steering system in accordance with claim 10 wherein said indexing means includes:
   means for providing a light beam;
   means responsive to said light beam for providing an electrical signal; and
   means coupled for rotation with said rotatable circular heading angle scale and said pointer for interrupting said light beam to establish an index for said rotatable circular heading scale and an index for said pointer.

12. A ship steering system in accordance with claim 11 wherein said heading repeater further includes:
   a first step motor coupled to rotate said rotatable circular heading angle scale;
   means for providing a ship heading representative signal;
   means coupled to said first step motor and responsive to said index signal of said rotatable circular heading angle scale and said ship heading representative signal for providing signals to operate said first step motor;
   a second step motor coupled to rotate said pointer;
   course order change means for providing a course order change signal; and
   means coupled to said second step motor and responsive to said course order change signal, said ship heading representative signal, and said pointer index signal for providing operating signals to said second step motor.

13. A ship steering system having means for positioning at least one rudder and means for providing an off course alarm, wherein said off course alarm means includes:
   means for providing a ship heading representative signal;
   course order means for providing a course order representative signal;
   means responsive to said heading representative signal and said course order representative signal for providing a heading error representative signal;
   means for providing an off course tolerance representative signal indicative of a maximum allowable heading error;
   first signal means responsive to said heading error representative signal and said off course tolerance representative signal for providing a first signal when said heading representative signal is less than said off course representative signal and a second signal when said heading representative signal exceeds said off course tolerance representative signals; and
   means responsive to said first and second signals for providing an alarm when said second signal is provided for a time duration that exceeds a preselected time interval before a transition from said second signal to said first signal occurs.

14. A ship steering system in accordance with claim 13 further including:
   means coupled to said course order means for providing a course change signal when a course order change is detected;
   means responsive to said course change signal for resetting said first signal means;
   means coupled to said course change signal means for delaying said course change signal for a preselected time interval, thereby providing a delayed course change signal;
   means enabled by said course change signal and responsive to said course order representative signal for providing a heading rate representative signal;
   means for providing a turn rate representative signal;
   means responsive to said heading rate representative signal and said turn rate representative signal for providing a maneuver error representative signal indicative of a difference between ship's heading rate and ship's turn rate;
   means for providing a maneuver tolerance representative signal indicative of a maximum allowable difference between ship's heading rate and ship's turn rate;
   second signal means enabled by said delayed course change signal and responsive to said maneuver error representative signal and said maneuver tolerance representative signal for providing a third signal when said maneuver error representative signal is less than said maneuver tolerance representative signal and a fourth signal when said maneuver error representative signal exceeds said maneuver tolerance representative signal; and
   means for coupling said third and fourth signals to said alarm means to provide an alarm when said fourth signal is coupled to said alarm means for said preselected time duration before a transition from said fourth signal to said third signal occurs.

15. A ship steering system in accordance with claim 14 further including means responsive to said course change representative signal, said heading error representative signal, and said heading error tolerance signal for enabling said first signal means and resetting said second signal means when said heading error representative signal is less than said heading error tolerance signal after said course change representative signal has been generated.

16. A ship steering system having a controller for positioning at least one rudder by rudder positioning means which comprises:
   means for receiving rudder command signals;
   first and second pilots, each including first and second sets of solenoid controllers, each set of solenoid controllers responsive to said rudder command signals to provide a set of solenoid control signals, said first and second pilots further including first switch means coupled to said solenoid controllers for coupling selected sets of said solenoid control signals to selected rudder control solenoids of said at least one rudder to establish a selected rudder control system.

17. The steering system of claim 16 wherein said first set of solenoid controllers in said first and second pilots provide solenoid control signals for one rudder and said second set of solenoid controllers in said first and second pilots provide solenoid control signals for a rudder other than said one rudder.

18. A ship's steering system in accordance with claim 17 wherein:

said switch means includes first and second switch means, said first and second switch means each containing first and second switches;

said first and second sets of solenoid controllers in said first and second pilots each include six solenoid controllers, a first group of three of said six solenoid controllers in said first set of solenoid controllers of said first pilot being coupled to said first switch of said first switch means and a second group of three solenoid controllers of said first set of solenoid controllers of said first pilot coupled to said first switch of said second switch means, a first group of three solenoid controllers of said second set of solenoid controllers in said first pilot coupled to said second switch of said first switch means and a second group of three solenoid controllers of said second set of solenoid controllers in said first pilot coupled to said second switch of said second switch means, a first group of three solenoid controllers of said first set of solenoid controllers in said second pilot coupled to said first switch of said second switch means and a second group of three solenoid controllers of said first set of solenoid controllers in said second pilot coupled to said first switch of said first switch means, a first group of three solenoid controllers of said second set of solenoid controllers in said second pilot coupled to said second switch of said second switch means and a second group of three solenoid controllers of said second set of solenoid controllers in said second pilot coupled to said second switch of said first switch means;

said first switch of said first switch means operable to select between said first group of three solenoid controllers of said first set of solenoid controllers in said first pilot and said second group of solenoid controllers in said first set of solenoid controllers in said second pilot to provide a first set of three solenoid control signals;

said second switch of said first switch means operable to select between said first group of three solenoid controllers of said second set of solenoid controllers in said first pilot and said second group of solenoid controllers of said second set of solenoid controllers in said second pilot to provide a second set of solenoid control signals;

said first switch of said second switch means operable to select between said first group of three solenoid controllers of said first set of solenoid controllers in said second pilot and said second group of solenoid controllers of said first set of solenoid controllers in first pilot to provide a third set of three solenoid control signals; and said second switch of said second switch means operable to select between said first group of three solenoid controllers of said second set of solenoid controllers in said second pilot and said second group of three solenoid controllers of said second set of solenoid controllers in said first pilot to provide a fourth set of solenoid control signals.

19. The ship steering system of claim 16 wherein:

said means for receiving rudder command signals includes NFU means for receiving non-follow up rudder control signals and FFU means for receiving full follow up rudder command signals, said FFU means being coupled to said first switch means; and wherein said first and second pilots further include second switch means coupled between said first switch means and said rudder control solenoids and further coupled to to said NFU means for selectively providing said non-follow up rudder control signals and said full follow up rudder command signals, coupled through said first switch, to said rudder control solenoids.

* * * * *